United States Patent [19]
Jamison

[11] 4,139,217
[45] Feb. 13, 1979

[54] VEHICULAR DESK UNIT

[76] Inventor: Gerald A. Jamison, 239 Dahlia Ave., Dorval, Quebec, Canada, H9S 3N6

[21] Appl. No.: 861,628

[22] Filed: Dec. 19, 1977

[51] Int. Cl.$^2$ .......................... B42D 17/00; B60R 7/08
[52] U.S. Cl. ................................ 281/15 A; 281/15 B; 224/29 E; 224/29 M
[58] Field of Search ....................... 281/1, 15 A, 15 B; 224/29 E, 29 M; 40/10 A, 19.5

[56] References Cited
U.S. PATENT DOCUMENTS

| | | | |
|---|---|---|---|
| 1,020,875 | 3/1912 | Baillod | 281/15 B |
| 1,344,498 | 6/1920 | Fox | 281/15 A |

FOREIGN PATENT DOCUMENTS 885350  11/1971  Canada .................................. 224/29 E Primary Examiner—Leonidas Vlachos
Attorney, Agent, or Firm—Daniel Jay Tick

[57] ABSTRACT

A board-like desk member has a planar writing surface and a spaced opposite parallel planar back surface. A fastening device affixed to the back surface of the desk member removably affixes the desk member to the steering wheel of the vehicle in juxtaposition with the steering wheel and parallel to such wheel whereby a person seated behind the wheel may comfortably use the desk member as a desk. A ledge member extends across the desk member and is slidably mounted thereon for movement from top to bottom thereof. A securing device releasably secures the ledge member to a desired position on the writing surface of the desk member.

3 Claims, 3 Drawing Figures

VEHICULAR DESK UNIT

BACKGROUND OF THE INVENTION

The present invention relates to a vehicular desk unit. More particularly, the invention relates to a vehicular desk unit for an automotive vehicle having a steering wheel.

Vehicular desk units of the type disclosed herein are described in the following United States patents. U.S. Pat. No. 1,977,507, issued Oct. 16, 1934 to Edwards, U.S. Pat. No. 2,150,709, issued Mar. 14, 1939 to Bake, U.S. Pat. No. 2,201,789, issued May 21, 1940 to Robilotto, U.S. Pat. No. 2,518,127, issued Aug. 8, 1950 to Dobbs, U.S. Pat. No. 2,661,222, issued Dec. 1, 1953 to Wolfe and U.S. Pat. No. 2,732,642, issued Jan. 31, 1956 to Thompson.

Objects of the invention are to provide a vehicular desk unit of simple structure, which is inexpensive in manufacture, installed on a steering wheel and removed from the steering wheel with facility, convenience and rapidity, and functions efficiently, effectively and reliably as a desk in a vehicle, especially useful for sales people and others who must keep accounts, records, and the like, while on the road, in their vehicles.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
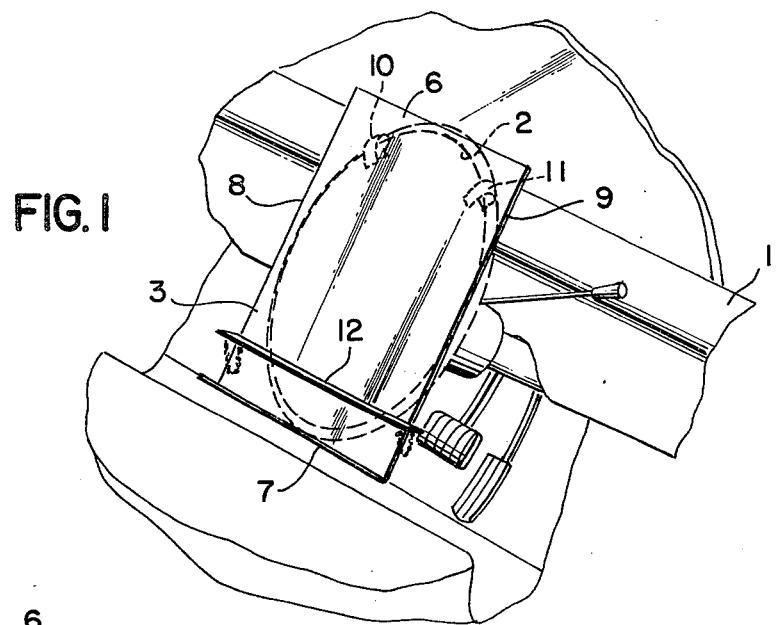
FIG. 1 is a perspective view of the embodiment of the vehicular desk unit of the invention.

The vehicular desk unit of the invention is for an automotive vehicle 1 having a steering wheel 2 (FIG. 1).

Figure 2:
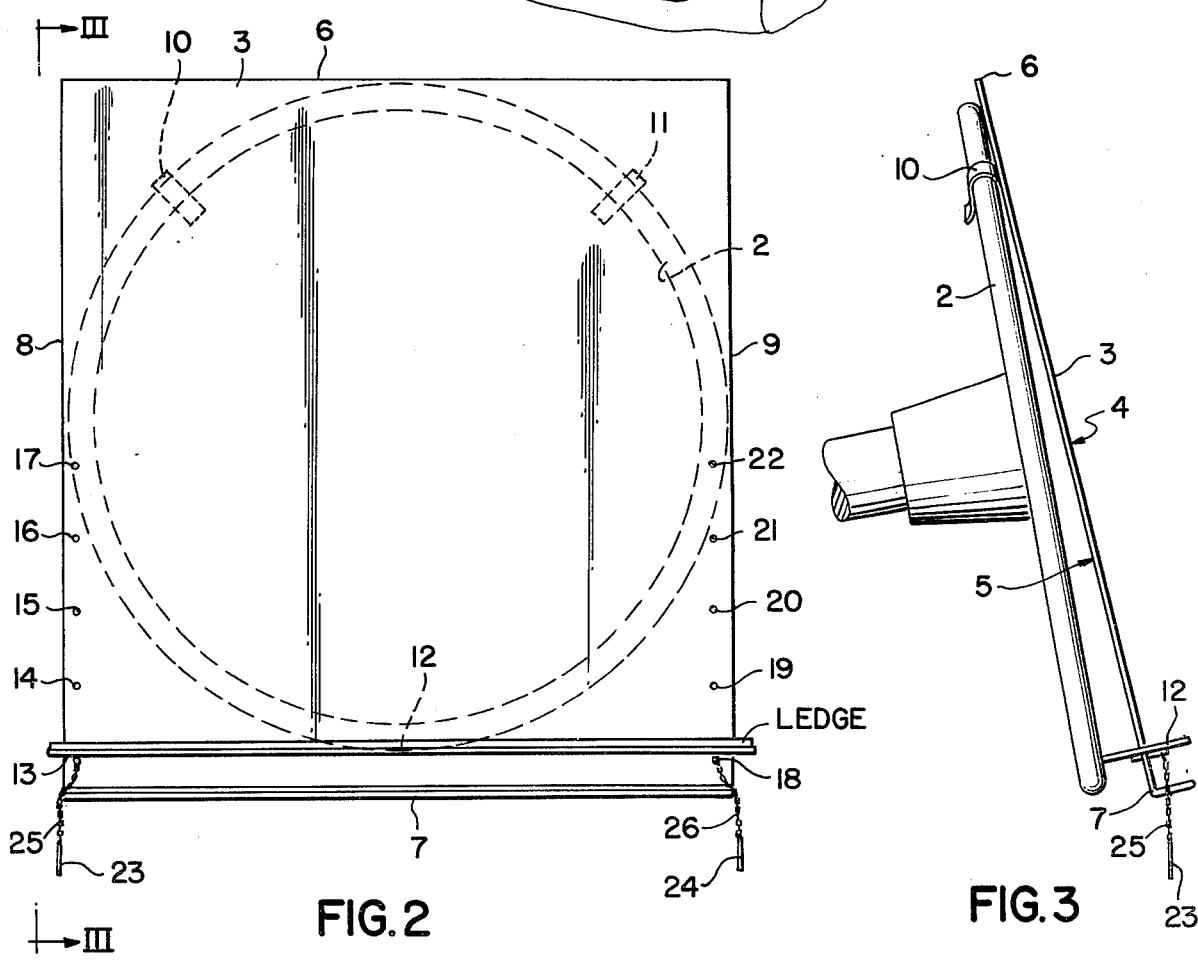
FIG. 2 is a top plan view, on an enlarged scale, of the embodiment of FIG. 1.
Figure 3:
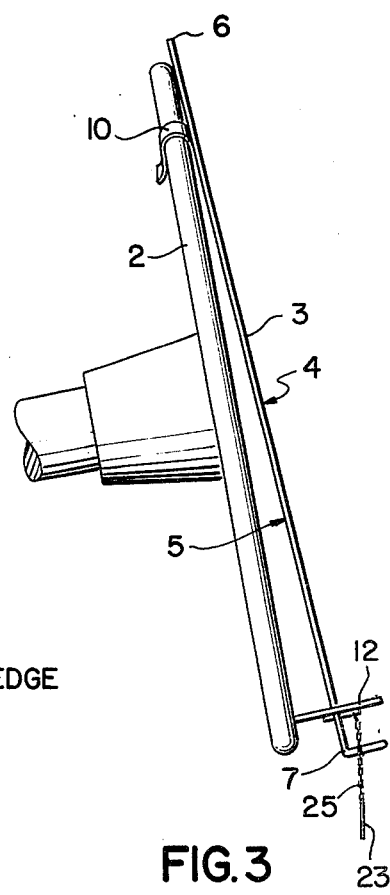
FIG. 3 is a view, taken along the lines III—III, of FIG. 2.

The vehicular desk unit of the invention comprises a board-like desk member 3 having a substantially planar writing surface 4 (FIG. 3) and a spaced opposite substantially parallel, substantially planar back surface 5 (FIG. 3). The desk member 3 has a top 6, a bottom 7 and sides 8 and 9 (FIGS. 1 and 2).

A fastening device affixed to the back surface 5 of the desk member 3 removably affixes said desk member to the steering wheel 2 in substantial juxtaposition with said steering wheel and substantially parallel to said steering wheel, as shown in the FIGS., whereby a person seated behind said steering wheel may comfortably use the desk member as a desk. The fastening device, as shown in the FIGS., comprises C-type spring clamps 10 and 11.

A ledge member 12 extends across the desk member 3 and is slidably mounted on said desk member for movement from top to bottom thereof.

A securing device releasably secures the ledge member 12 to a desired position on the writing surface 4 of the desk member. The securing device comprises a first plurality of spaced holes 13, 14, 15, 16, 17 in the writing surface 4 of the desk member 3, along the side 8 thereof, as shown in FIG. 2, a second plurality of spaced holes 18, 19, 20, 21, 22 in said writing surface of said desk member along the side 9 thereof, as shown in FIG. 2, and a pair of pegs 23 and 24 releasably insertable in the holes for preventing the ledge member 12 from sliding downward. More particularly, the peg 23 is releasably insertable in a selected one of the holes 13 to 17 under the ledge member 12 after said ledge member is positioned on the desk member 3. The peg 24 is releasably insertable in a selected one of the holes 18 to 22 under the ledge member 12 after said ledge member is positioned, as desired, on the desk member 3.

The peg 23 is affixed to the desk member 3 via a chain 25 and the peg 24 is affixed to said desk member via a chain 26 to prevent misplacement thereof.

While the invention has been described by means of a specific example and in a specific embodiment, I do not wish to be limited thereto, for obvious modifications will occur to those skilled in the art without departing from the spirit and scope of the invention.

I claim:

1. A vehicular desk unit for an automotive vehicle having a steering wheel, said vehicular desk unit comprising
 a board-like desk member having a substantially planar writing surface and a spaced opposite substantially parallel substantially planar back surface, said desk member having a top, a bottom and sides;
 fastening means affixed to the back surface of the desk member for removably affixing said desk member to the steering wheel in substantial juxtaposition with said steering wheel and substantially parallel to said steering wheel whereby a person seated behind said steering wheel may comfortably use said desk member as a desk;
 a ledge member extending across the desk member and slidably mounted on said desk member for movement from top to bottom thereof; and
 securing means for releasably securing the ledge member to a desired position on the writing surface of the desk member.

2. A vehicular desk unit as claimed in claim 1, wherein said fastening means comprises C-type spring clamps.

3. A vehicular desk unit as claimed in claim 1, wherein said securing means comprises a first plurality of spaced holes in the writing surface of the desk member along one side thereof, a second plurality of spaced holes in the writing surface of said desk member along the other side thereof and a pair of pegs releasably insertable in the holes for preventing the ledge member from sliding downward.

* * * * *